US008690649B2

(12) United States Patent
Nicolajsen et al.

(10) Patent No.: US 8,690,649 B2
(45) Date of Patent: Apr. 8, 2014

(54) LIVESTOCK HEAD SPLITTING APPARATUS AND OPERATING METHOD OF SAME

(76) Inventors: Jeff Nicolajsen, Sperling (CA); Russ Nicolajsen, Sperling (CA); Warren Nordquist, Sperling (CA)

( * ) Notice: Subject to any disclaimer, the term of this patent is extended or adjusted under 35 U.S.C. 154(b) by 360 days.

(21) Appl. No.: 13/032,093

(22) Filed: Feb. 22, 2011

(65) Prior Publication Data

US 2011/0183593 A1    Jul. 28, 2011

(51) Int. Cl.
*A22B 5/20* (2006.01)
*A22C 17/02* (2006.01)

(52) U.S. Cl.
USPC .......................................... 452/160; 452/152

(58) Field of Classification Search
USPC .................... 452/149–150, 152–153, 160
See application file for complete search history.

(56) References Cited

U.S. PATENT DOCUMENTS

| | | | |
|---|---|---|---|
| 2,829,398 A * | 4/1958 | Carpenter et al. | 452/160 |
| 3,105,993 A | 10/1963 | Cook et al. | |
| 3,890,673 A | 6/1975 | Neubauer | |
| 4,052,769 A | 10/1977 | Taillet et al. | |
| 4,237,580 A * | 12/1980 | Croasdell | 452/149 |
| 4,414,708 A | 11/1983 | Sauvago | |
| 4,653,145 A | 3/1987 | Swilley | |
| 4,662,028 A * | 5/1987 | Leining | 452/160 |
| 6,027,405 A * | 2/2000 | Leining et al. | 452/160 |

FOREIGN PATENT DOCUMENTS

GB          2134369      *   8/1984

* cited by examiner

*Primary Examiner* — David Parsley
(74) *Attorney, Agent, or Firm* — Kyle R. Satterthwaite; Ryan W. Dupuis; Ade & Company Inc.

(57) ABSTRACT

A livestock head splitting apparatus of a rotary type rotates a plurality of head trays and respective blades sequentially through loading, head-splitting and discharge stations spaced around the shaft, and in a head splitting mode, drives each head tray and blade relatively toward one another in the head splitting station. In a unique cleaning mode, the trays and blades are instead kept apart throughout the rotation to maximize the exposure of each tray to a spray of cleaning fluid directed into the apparatus. A computerized control system cooperates with an electric motor to drive the rotation and give a degree of user-control over operational aspects of the motor, such as the running speed of the apparatus in the cleaning and head splitting modes and a jogging speed of the apparatus used to index the head trays to desirable locations.

18 Claims, 6 Drawing Sheets

LIVESTOCK HEAD SPLITTING APPARATUS AND OPERATING METHOD OF SAME

FIELD OF THE INVENTION

The present invention relates generally to an apparatus for splitting the heads of livestock for organ recovery therefrom, and more particularly to a rotary head splitting apparatus simultaneously moving multiple heads through loading, splitting and discharge stations disposed around the drive shaft of the apparatus.

BACKGROUND OF THE INVENTION

Different apparatuses have previously been developed for the purpose of splitting open the heads of livestock animals in order to extract contents from the skull, for example the brain or other head organ.

U.S. Pat. Nos. 3,105,993 and 4,052,769 teach devices of a type featuring a vertically reciprocal knife or blade that descends downwardly toward a stand on which the head is positioned to effect the splitting operation.

Another type shown in U.S. Pat. No. 3,890,673 features a movable bed or head support means indexed through a head-splitting cabinet that features gates that close off the cabinet during the splitting operation.

U.S. Pat. No. 4,414,708 teaches another prior art apparatus using a rotary blade positioned over a conveyer which moves multiple heads past the blade on platens that are synchronized to the blade rotation so that the brain and pituitary gland are left intact at notches in the blade periphery.

U.S. Pat. No. 4,653,145 teaches a rotary head splitter in which head trays rotatably move around a hydraulically rotated shaft through loading, head-splitting and discharge stations. A vertically reciprocal blade is respectively carried over each tray and is hydraulically driven toward the tray as it moves through the head-splitting station. Multiple heads are thus moving through the apparatus at any given time, each being loaded by an operator at the loading station and automatically discharged from the machine after splitting.

Applicant has developed an improved rotary head splitter having unique and advantageous features and operational aspects not shown or suggested by the aforementioned prior art.

SUMMARY OF THE INVENTION

According to a first aspect of the invention there is provided a livestock head splitting apparatus for splitting livestock heads, the apparatus comprising:

a frame;

a vertical shaft supported on the frame and rotatable about a vertical longitudinal axis of the shaft;

a plurality of head trays positioned circumferentially about the shaft and extending horizontally away therefrom, each head tray being connected to the shaft for movement about the axis sequentially through loading, head-splitting and discharge stations circumferentially spaced around the shaft under rotation of the vertical shaft in a predetermined direction;

a plurality of head splitting blades disposed above the head trays in positions lying respectively thereover and arranged to move with the head trays about the axis through the loading, head-splitting and discharge stations under rotation of the vertical shaft in the predetermined direction;

a head splitting actuation system operable in cooperation with the head trays and the head splitting blades under rotation of the shaft to drive each head tray and the respective head splitting blade relatively toward one another from spaced apart positions during passage through the head-splitting station and subsequently draw the head tray and respective head splitting blade relatively away from one another back to the spaced apart positions while approaching the discharge station; and a control system cooperatively linked with the head splitting actuation system and operable to switch into and out of a head splitting mode of operation in which the head splitting actuation system forces together and draws apart each head tray and the respective head splitting blade during passage through the head splitting station, and a cleaning mode of operation in which each head tray and the respective head splitting blade are not driven toward one another during rotation about the axis.

Preferably the control system is arranged to remove a source of power from the actuation system under switching into the cleaning mode and apply said source of power to the actuation system under switching into the head splitting mode.

Preferably the source of power for the actuation system is provided by a hydraulic pump for actuating hydraulic actuators of the actuation system, and a rotational drive system coupled to the shaft to effect the rotation thereof is operable separately from the hydraulic pump.

Preferably the rotational drive system comprises an electric motor linked to the shaft to effect the rotation thereof.

Preferably the head splitting actuation system are arranged to effect lifting of each head tray toward the respective blade in the head splitting mode of operation.

Preferably there is provided an enclosure closing around the shaft and the loading, head-splitting and discharge stations disposed circumferentially around the shaft, the enclosure comprising at least one access opening through which fluid can be sprayed to clean an interior of the enclosure, whereby operation in the cleaning mode effects rotation of the head trays past the access opening and maintains the head trays and the blades in the spaced apart positions throughout said rotation to maximize exposure of said trays to sprayed fluid.

Preferably the control system comprises a computerized control system.

Preferably the control system is arranged to perform confirmation of successful drawing apart of each head tray and respective head splitting blade back to the spaced apart positions, and to stop rotation of the shaft under a lack of said confirmation for any tray.

Preferably there is provided a discharge device operable in the head splitting mode to displace a split head from off each head tray as said head tray moves through the discharge station, wherein the control system comprises a sensor operable to provide confirmation of successful head displacement operation of the discharge device for each tray passing through the discharge station in the head splitting mode and is arranged to stop rotation of the electric motor under a lack of said confirmation for any tray.

According to a second aspect of the invention there is provided a method of operating a livestock head splitting apparatus comprising a vertical shaft rotatable about an axis; a plurality of head trays positioned circumferentially about the shaft and extending horizontally away therefrom in connection therewith for movement about the axis sequentially through loading, head-splitting and discharge stations circumferentially spaced around the shaft under rotation of the vertical shaft in a predetermined direction; and a head splitting actuation system operable to drive each head tray and a respective splitting blade situated thereabove relatively toward one another from spaced apart positions during passage of said head tray through the head-splitting station and subsequently draw said head tray and said respective head splitting blade relatively away from one another back to the spaced apart positions while approaching the discharge station; the method comprising:

operating the apparatus in a cleaning mode in which the vertical shaft is driven for rotation about the axis to convey the head trays sequentially through the loading, head-splitting and discharge stations without driving each blade and the respective head splitting blade relatively toward one another during passage through the head-splitting station; and during operation of the apparatus in the cleaning mode, directing a fluid spray toward the head trays rotating about the axis of the vertical shaft to clean off surfaces of said head trays with said fluid spray.

According to a third aspect of the invention there is provided a livestock head splitting apparatus for splitting livestock heads, the apparatus comprising:

a frame;

a vertical shaft supported on the frame and rotatable about a vertical longitudinal axis of the shaft;

a plurality of head trays positioned circumferentially about the shaft and extending horizontally away therefrom, each head tray being connected to the shaft for movement about the axis sequentially through loading, head-splitting and discharge stations circumferentially spaced around the shaft under rotation of the vertical shaft in a predetermined direction;

a plurality of head splitting blades disposed above the head trays in positions lying respectively thereover and arranged to move with the head trays about the axis through the loading, head-splitting and discharge stations under rotation of the vertical shaft in the predetermined direction;

a head splitting actuation system operable in cooperation with the head trays and the head splitting blades under rotation of the shaft to drive each head tray and the respective head splitting blade relatively toward one another from spaced apart positions during passage through the head-splitting station and subsequently draw the head tray and respective head splitting blade relatively away from one another back to the spaced apart positions while approaching the discharge station;

an electric motor linked to the shaft to effect the rotation thereof; and a computerized control system linked to the motor and comprising an input device arranged to receive input from an operator for controlling at least one operational parameter of said electric motor.

Preferably the computerized control system is arranged to change a rotational running speed of the motor in response to user run speed input at the input device.

Preferably the computerized control system is arranged to change a rotational jogging speed of the motor in response to user jog speed input at the input device.

Preferably the computerized control system is arranged to receive separate user inputs for ongoing rotation of the shaft for head splitting operations and incremental rotation of the shaft between such operations for jogging the head trays into a desired position around the axis.

Preferably there is provided a discharge device operable to displace a split head from off each head tray as said head tray moves through the discharge station, wherein the control system is arranged to change an operational parameter of the discharge device according to the change of the rotational running speed based on the user run speed input.

Preferably the control system is arranged to change a point in rotation of the shaft at which the discharge device is actuated.

Preferably there is provided a rotary encoder arranged to monitor rotation of the shaft.

Preferably the computerized control system comprises a sensor operable to provide confirmation of successful displacement operation of the discharge device for each tray passing through the discharge station, the computerized control system being arranged to stop rotation of the electric motor under a lack of said confirmation for any tray.

Preferably the computerized control system comprises a sensor operable to provide confirmation of successful drawing apart of each head tray and respective head splitting blade back to the spaced apart positions while approaching the discharge station, the computerized control system being arranged to stop rotation of the electric motor under a lack of said confirmation for any tray.

Preferably the computerized control system presents operation mode input options by which the operator can select to operate the apparatus in a head splitting mode in which the head splitting actuation system forces together and draws apart each head tray and the respective head splitting blade during passage through the head splitting station, and a cleaning mode in which each head tray and the respective head splitting blade are not driven toward one another during rotation about the axis.

Preferably the computerized control comprises a processor, memory linked to the processor, and a program stored on the memory, the program including program code executable by the processor to display prompts to the operator at a display device for input from an input device on the operational parameter of said electric motor, to store data reflective of said input, and to use said data to adjust an output signal to be sent to the motor for control of the operational parameter thereof during operation of the motor.

Preferably the program includes further program code executable by the processor to prompt the operator at the display device for an authorized password, and verify an entered password against the authorized password before prompting the operator for the input on the operational parameter of said electric motor.

BRIEF DESCRIPTION OF THE DRAWINGS

In the accompanying drawings, which illustrate an exemplary embodiment of the present invention.

DETAILED DESCRIPTION

Figure 1:
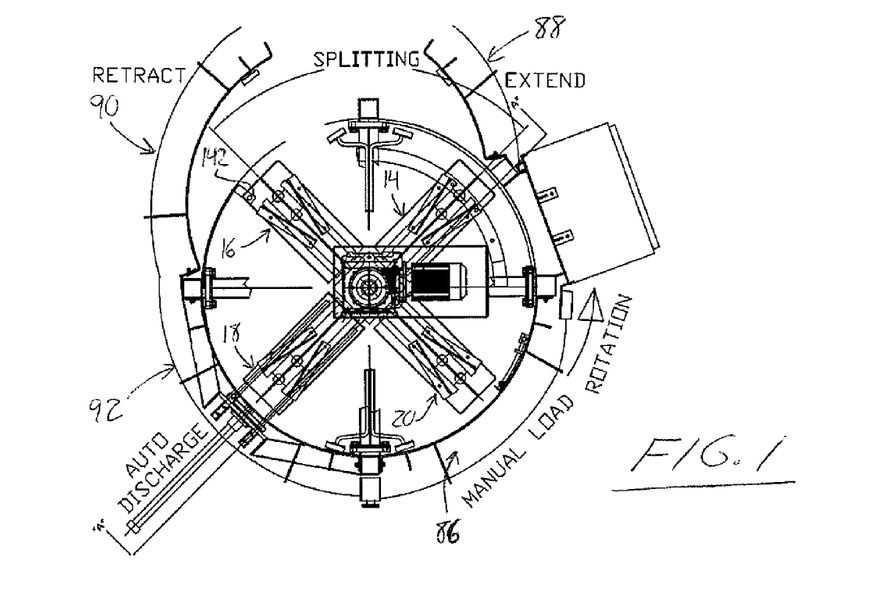
FIG. 1 is a schematic overhead plan view of a rotary head splitting apparatus of the present invention.
Figure 2:
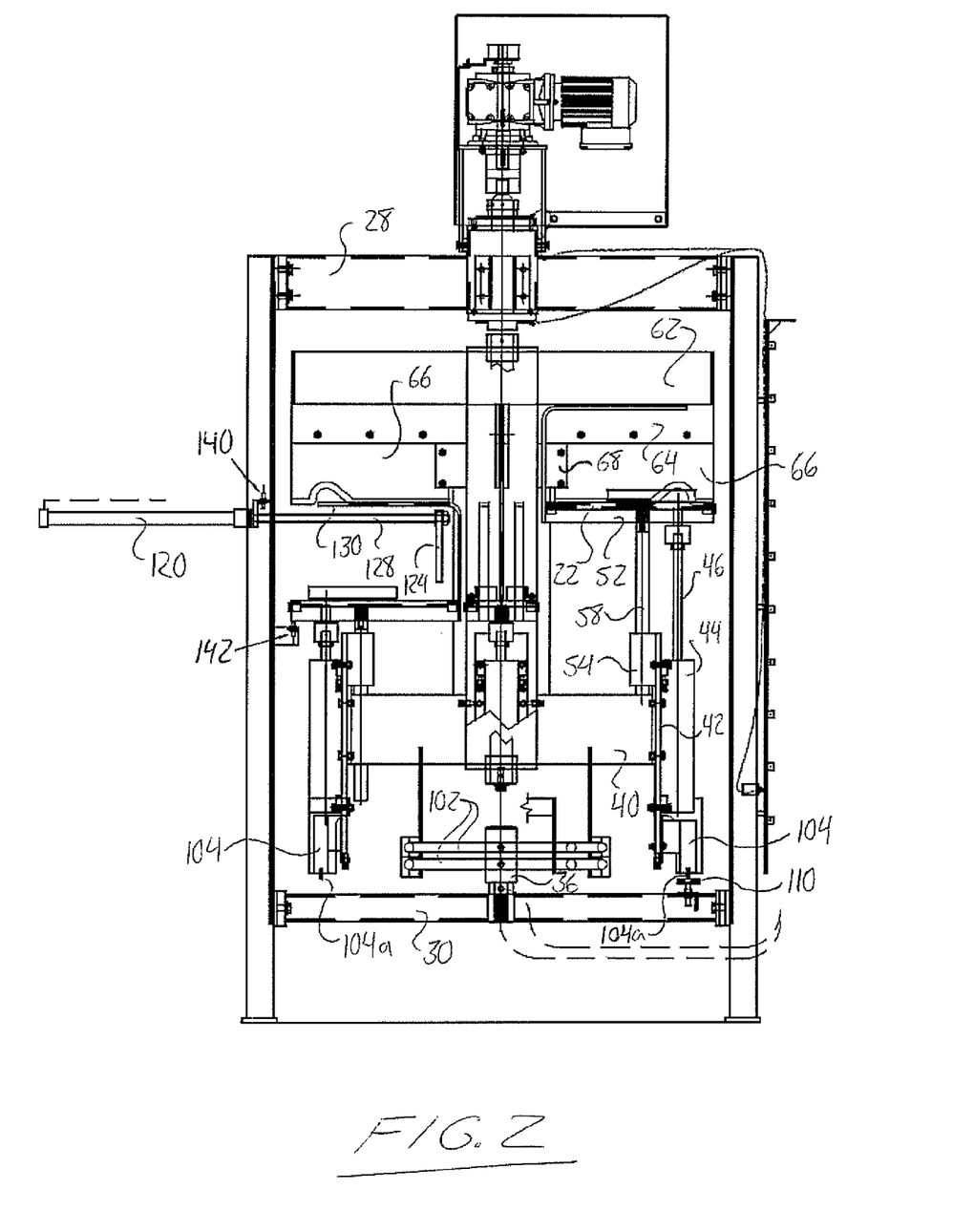
FIG. 2 is a schematic cross-sectional view of the rotary head splitting apparatus of FIG. 1 as taken along line A-A thereof.
Figure 3:
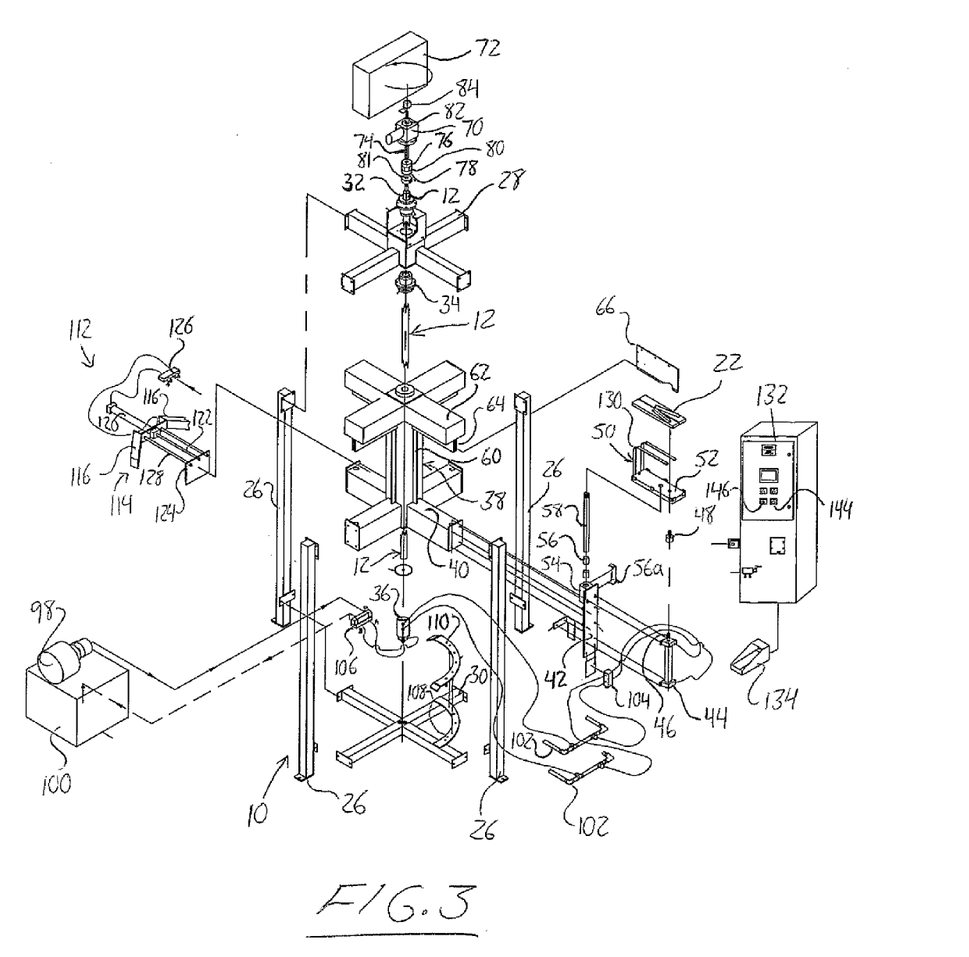
FIG. 3 is a schematic exploded view of the rotary head splitting apparatus of FIG. 2 with enclosure panels thereof omitted for illustration.

Referring now to the drawings, and particularly to FIGS. 1 to 3, the head-splitting apparatus of the illustrated embodiment includes a frame 10 rotatably supporting a vertical shaft 12. Positioned at proximate an upper end of the shaft are a plurality of head-splitting units 14, 16, 18 and 20. The head-splitting units are rotatably driven through loading, head splitting and discharge stations situated circumferentially around the shaft 12. At the loading station, heads are individually loaded onto respective trays 22 that lie beneath blades of the head splitting units. Rotating around the shaft, each head is then split in the head-splitting station by driving of the tray toward the head splitting station, and discharged from the device at the discharge station in split condition so that the internal organs may easily be removed. A protective enclosure 24 is formed of a number of panels that cooperate to close around the stations of the apparatus.

The frame includes four upstanding legs 26 spaced ninety degrees apart around the axis of the shaft 12 at equal radial distances outward therefrom, and upper and lower reinforcing bars 28 and 30 crossing diagonally at right angles to interconnect the upstanding legs 26 to provide a rigid frame or stand for supporting the vertical shaft 12 and the head-splitting units. The vertical shaft 12 is rotatably received in upper bearing members 32, 34 suitably secured atop and beneath to the upper reinforcing bars 28 and a rotating union valve 36 suitably secured to the lower reinforcing bars 30.

Between the lower of the two upper bearings 34 near the top of the shaft 12 and the rotating union valve 36 coupled to the bottom of the shaft, a square-in-cross-section hub 38 is carried by the shaft 12 and carries the head-splitting units 14, 16, 18 and 20. Each head-splitting unit is identical, and while four are illustrated in FIG. 1, it may be appreciated that the number of units may be varied. For purposes of simplicity, only one of the head-splitting units is shown in the exploded view of FIG. 3, to which specific reference and description is now made as follows.

Each head-splitting unit includes a radially extending lower support bracket 40 mounting at its outer end a vertically disposed mounting plate 42, which in turn carries a vertically oriented double-acting hydraulic cylinder 44 having a movable piston 46 rod projecting from the top end of the cylinder. Suitably attached to the top end of the piston 46, for example by an alignment coupling 48, is a head tray holder 50 featuring a horizontally planar base plate 52 atop which a head tray 22 is seated in turn. At the top end of the mounting plate 42, a block 54 is carried on the inner face of this plate in a position over the support bracket 40 and features a vertical through bore equipped with bearings 56 that are held in place by a bearing retainer 56a. This bore aligns with a respective vertical bore through the support bracket 40 and a guide shaft 58 is slidingly received in these aligned vertical bores. The top end of the guide shaft 56 is coupled to the base 52 of the tray holder 50 that overlies the support bracket 40 in the assembled apparatus. The guide shaft lies in the same radial plane of the main rotating shaft 12 as the piston rod 46 of the cylinder 44, and thus acts to maintain the assembled head tray holder 50 and head tray 22 in a radial orientation relative to the main rotating shaft 12 during lifting and lowering of the cylinder piston 46. Such alignment is further maintained by engagement of a vertical rib 60 jutting radially from the hub 38 over the respective support bracket 48 into aligned notches or slots in the tray holder base 52 and the tray 22 at the ends thereof sitting adjacent the hub 38.

Each head-splitting unit further includes a radially extending upper support bracket 62 aligned with the lower support bracket 40 at a distance upward therefrom. A pair of parallel vertical walls 64 depend a short distance downward from the support bracket along the lengthwise dimension thereof (i.e. in the same radial direction relative to the main rotational axis 12). The thin slot left between these walls 64 is of suitable width to receive therein a knife or blade 66 of the type for splitting an animal head of the type for which the device is intended. Aligned holes in the in the blade 66 and the blade supporting walls 64 are spaced along the upper edge of the blade for receiving fasteners through the aligned holes to secure the blade in place for use. As shown in FIG. 2, additional support walls 68 may extend partly down the vertical rib 60 on the opposite sides thereof and similarly be equipped with aligned holes for fastening the blade in place at spaced apart positions along its inner end nearest the hub 38.

The shaft 12 and head-splitting units are rotatably driven by an electric gear motor 70 mounted in a housing 72 fixed atop the upper reinforcing bars 28. The gear motor has an output shaft 74 coupled to the main shaft 12 of the apparatus, for example by a pair of coupling hubs 76, 78 engaged together via a spider 80 above a collar 81 of the main shaft 12. A shaft collar 82 of the gear motor 70 is equipped with an industrial rotary encoder 84 to monitor the output shaft's rotation by measuring the angular position thereof about the shaft's longitudinal axis.

Figure 4:
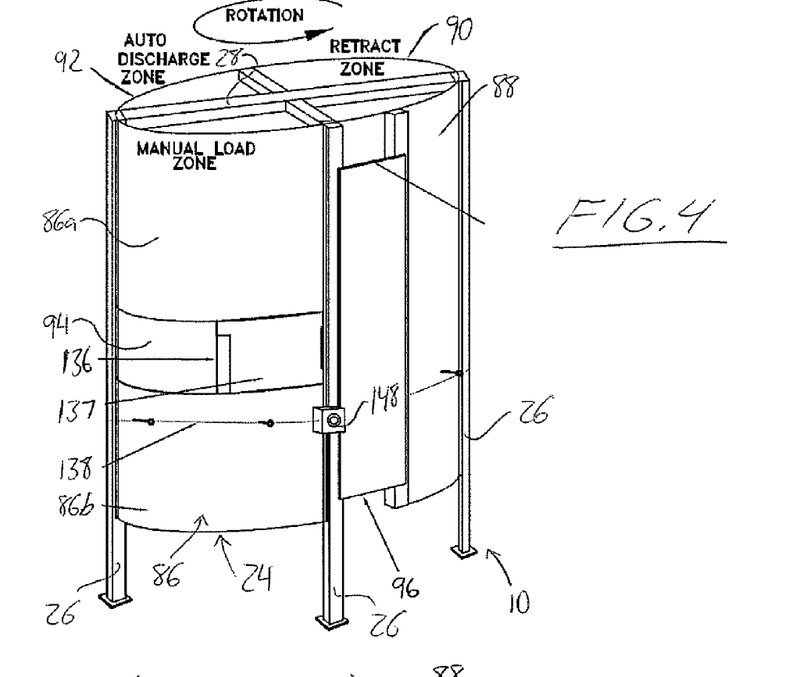
FIG. 4 is a schematic isometric view of an assembled frame and enclosure of the rotary head splitting apparatus.

Turning to FIGS. 1 and 4, arcuate panel sections 86, 88, 90, 92 curve around the main shaft at a radial distance outwardly past the outer ends of the head splitting units 14, 16, 18, 20, and span vertically from the upper reinforcement 28 to the lower reinforcement 30, thereby forming the outer protective shield or cover of an enclosure containing all the moving parts of the apparatus. At the loading station, an access opening 94 is provided for purposes of loading heads onto the trays as the head-splitting units pass the loading station. To create this opening, the panel section 86 at the loading station may be formed by separate upper and lower guard panels 86a, 86b having vertical space between them to form the access opening 94. The only other opening in the enclosure cover during operation of the machine is provided at the discharge station where the split livestock heads automatically exit the interior of the enclosure in a manner describe herein further below. This limited number of openings to the interior space of the enclosure guards against inadvertent contact with the moving splitting units during use of the apparatus.

As In the illustrated embodiment, further access to the interior of the enclosure for cleaning or service when the machine is not in use can be achieved by swinging opening one or both of two hinged panels 88, 90 on one side of the machine. In the illustrated embodiment, loading panel section 86 covers the manual loading station and spans about ninety degrees around the central shaft of the machine, discharging panel section 92 covers the automatic discharge station and spans about ninety degrees around the shaft from one end of panel section 86, retracting panel section 90 spans about ninety degrees from the other end of discharge panel section 92, and extending panel section 88 spans about forty-five degrees from the other end of the retracting panel section 90. The approximately forty-five degrees remaining between the loading panel section 86 and the extending panel section 88 is occupied by a control panel mounting plate 96, as shown in FIG. 4. The extending and retracting panel sections 88, 90 are referred to as such because they cover the head splitting station when closed, and more particularly respectively cover the sections of the head splitting station where the cylinder piston 46 of each head splitting unit is extended upward and then retracted downward.

The hydraulic drive for the splitter device of the invention includes a pump 98 electrically powered by a suitable power pack or source 100. The pump 98 supplies high pressure hydraulic fluid to the stationary input of the rotating union 36 at the lower reinforcement 30 of the frame, and the output of the rotating union 36 in turn provides both high pressure and low pressure lines to the hydraulic cylinders 44 through hydraulic manifolds 102 that rotate with the shaft and cylinder control valves 104 that are each carried on the mounting plate of the respective cylinder 44 at a position therebeneath. A flow control valve 106 is provided between the pump 98 and the rotating union valve 36 for opening and closing high pressure (send) and low pressure (return) hydraulic paths between the pump and the control valves 104 of the hydraulic cylinders.

The control valve 104 of each head splitting unit is a two-position four-way cam-operated valve, and thus includes a movable control rod with a cam follower 104a. The control rod is biased to return to a default position after having been depressed by a cam and thereafter released. As shown in FIGS. 1 and 3, a horizontal bar or plate 108 arcuately spans ninety degrees about the axis of the main shaft 12 between adjacent perpendicular legs of the lower reinforcement 30 over approximately half of the head splitting station. A cam track 110 following the same arcuate path is fastened to the arcuate plate 108 in a position lying directly thereover to span between the adjacent legs of the lower reinforcement 30, but instead of being horizontally flat like the support plate 108 beneath it, features a flat central portion and two inclined ramp portions sloping upward to the horizontal central portion at opposite ends thereof. As shown in FIG. 2, the cam follower 104a of each control valve depends downward therefrom at a distance spaced above the lower reinforcement 30. The cam follower 104a, biased into its default lowered position, is only elevated from this position as it travels over the cam track 110 during passage through the head splitting station.

Therefore, when the electric motor is operated to drive the main shaft of the apparatus in the predetermined direction in which the loading, splitting and discharge stations are sequentially positioned in this order around the shaft axis (i.e. counterclockwise, as viewed from above, in the illustrated embodiment; FIG. 1), the cam follower 104a remains in its default position until the control valve reaches the entry ramp of the cam track at the beginning of the head splitting station. The default position of the cam follower 104a corresponds to the position of the valve in which the high pressure fluid conduit from the pump is communicated with the top port of the cylinder, thereby maintaining the cylinder's piston in a lowered position in which the respective head tray 22 is at a maximum distance below the corresponding blade 66. Only when the cam follower rides up onto the cam track 110 does the position of the valve switch from this default position, and instead communicate the high pressure fluid conduit with the bottom port of the cylinder to drive the cylinder's piston upward and carry the respective head tray up to the blade 66, thereby driving the animal head on the tray upwardly against the cutting edge at the bottom of the blade to split the head in two thereacross. As the cam follower completes its travel over the cam track 110 and thus returns to its lowered default position as it rides down the track's exit ramp, the valve returns to its normal state, pressurizing the top of the cylinder and driving the piston back downward to lower the head tray to its default lowered position. In FIG. 2, the head tray on the right is lifted up against the blade since the respective cam follower is riding on the cam track in the first half of the cutting station, while the head tray on the left is lowered since the respective cam follower is hanging in its default position at the cam-trackless discharge station.

A discharge or unloading device 112 is mounted to the enclosure discharge panel 92 at the discharge station of the enclosure and is operable to withdraw an animal head that has been split at the splitting station out of the enclosure interior from atop the head tray 22. A bracket 114 features two horizontal members 116 diverging away from one another at oblique angles and a horizontally elongated plate 118 interconnecting the two members 116 in a vertical plane. The members extending in generally tangential directions relative to the circular horizontal section of the apparatus enclosure and are fixed to the enclosure's discharge panel or the upstanding frame legs at opposite ends thereof. A horizontally oriented two-way pneumatic cylinder 120 is carried by the plate 118 interconnecting the two tangential members 116 so that its piston rod 122 extends perpendicularly from the plate 118 between the tangential members on the side of the plate facing into the interior of the enclosure. At a distal end furthest from the cylinder 120, the piston rod 122 carries another vertically oriented plate, the bottom edge of which resides at an elevation slightly above the uppermost extent of the head trays of the head splitting units. This plate forms a plow 124 for drawing the split animal head outwardly off the head tray and through the discharge opening in the enclosure panel. A four-way two-position pneumatic solenoid valve 126 is operable to selectively communicate a source of compressed supply air with either one of the cylinder's two ports depending on the position of the solenoid.

FIG. 2 shows the extended position of the plow plate 124, which corresponds to the cylinder rod 122 being extended to its maximum reach from the cylinder into the enclosure by actuating the solenoid of the valve to move out of its default state communicating the supply air with the inner end of the cylinder to its extended state communicating the supply air with the outer end of the cylinder. This extension of the cylinder positions the plow plate or blade 124 near the inner end of the head tray nearest the rotatable hub 38. The piston rod 122 and the upper edge of the plow blade 124 are disposed at an elevation a short distance below the lower edge of the head splitting blades 66. The plow blade 124 is deployed to this extended position near the hub 38 as a split animal head approaches the discharge device while transitioning between the head splitting and discharge stations after lowering of the head tray from the blade in the second part of the head splitting station. The rotation of the head tray and respective splitting blade toward the now-extended plow blade positions the plow blade between them near the hub, and thus behind the animal head. At this point, the solenoid actuating signal to the pneumatic valve 126 is removed, thereby returning the solenoid to its default retracted position opening the inner end of the pneumatic cylinder to the supply air to retract the cylinder's piston rod 122, thus pulling the plow blade 124, and the animal head in front of it, toward the discharge opening in the enclosure panel 92 beneath the discharge device 112, where the head is thus ejected. To maintain a fixed orientation of the plow blade 124, additional guide rods or bars 128 are fixed to the plate at one end and slidably extend through holes in the bracket plate 118 in directions parallel to the piston rod 122.

In operation of the apparatus, an operator stands at the loading station and loads heads one at a time, each onto a tray positioned at or moving through the loading station. These trays are provided with suitable blocks or wedges for supporting the heads in the desired position, as seen particularly in FIG. 3. For example, a hog's head inserted or loaded nose first into the enclosure and forehead down to the position where it is exposed centrally below the knife blade so that when the head tray is lifted up to the blade, the blade will split the head into two substantially equal halves in the head-splitting station. The blades are formed with a recess in the splitting edge at the blade's bottom in a conventional manner to avoid cutting the organs.

Each head tray is in the default lowered position at all times except when moving through the head-splitting station, and therefore it is in the down position when the head is loaded at the loading station. As a loaded tray moves through its rotational path around the shaft, the head tray remains in its default position spaced well below the respective blade until the head-splitting unit enters the head-splitting station. At that point, the control valve for the hydraulic cylinder of that head-splitting unit is triggered by engagement of its cam follower with the cam track, thereby causing the double-acting cylinder to drive the head tray upwardly through a head-splitting stroke. By the time the tray reaches its uppermost position, the head-splitting unit has advanced to a point in the head-splitting station where the cam follower defaults to its normal lowered position to cause the head tray to go through the return stroke and back to its default or home position. Two identical and parallel L-shaped wiper bars 130, as seen in FIG. 1, extend upwardly from the base 52 of each head tray support 50 at the inner end thereof and then bend to extend parallel to the base 52 a distance thereabove toward the outer end thereof. The horizontal spacing of these bars 130 accommodates the blade 66 therebetween during the head splitting and retracting stroke, so that the bars will wipe the head from the blade as the tray is lowered should the head have a tendency to stick to the blade.

Following the head-splitting operation, the head-splitting unit then transitions into the discharge station, during which the pneumatic cylinder of the discharge device is extended so that continued rotation of the head tray further into the discharge station situates the plow blade of the discharge device in position behind the split head. The plow blade and the piston rod fit below the wiper bars when the head tray is properly seated in its fully lowered position. The piston rod of the pneumatic cylinder retracts, pulling the plow blade and the head outwardly along the head tray until the head falls from the outer end thereof through the discharge opening in the enclosure panel.

With reference to FIG. 1, an electronic control panel 132 is provided to control operation of the system in view of user input on same. Preferably the control panel features a programmable logic controller (PLC) or other computerized control to monitor operating conditions of the apparatus and receive input from the operator, and set output signals to the appropriate equipment accordingly. The preferred embodiment employs a graphical display screen to provide visual feedback to the operator on the operational status of the machine and provide prompts or options for user input. The user input may be implemented through the same display unit by using a touch screen device, or may be implemented through other controls such as a touch pad or physical button panel, or a combination of multiple input device types.

Further description of operation and control of the apparatus will now be described with reference to an exemplary touch-screen PLC-based implementation of the control system for which display screenshots are shown in FIGS. 5 to 9. In the illustrated screenshots, selectable onscreen buttons have rectangular shapes, while indicators reflecting the status of apparatus components or operation are circular to distinguish them from user-operable buttons.

Figure 5:
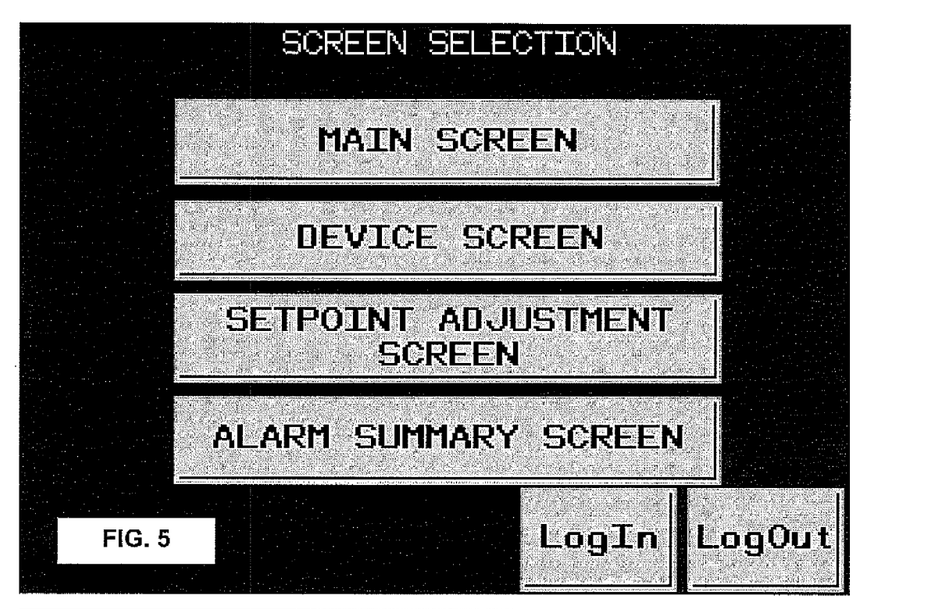
FIG. 5 is a screenshot of a selection screen of a control panel of the rotary head splitting apparatus.

From a selection screen shown in FIG. 5, an operator has the option to select from a "main screen", a "device screen", a "setpoint adjustment screen" or an "alarm summary screen". "Login" and "LogOut" options are also presented on the main screen, as the preferred embodiment places password protection on the availability of certain options in the control system, as will be described herein further below.

Figure 6:
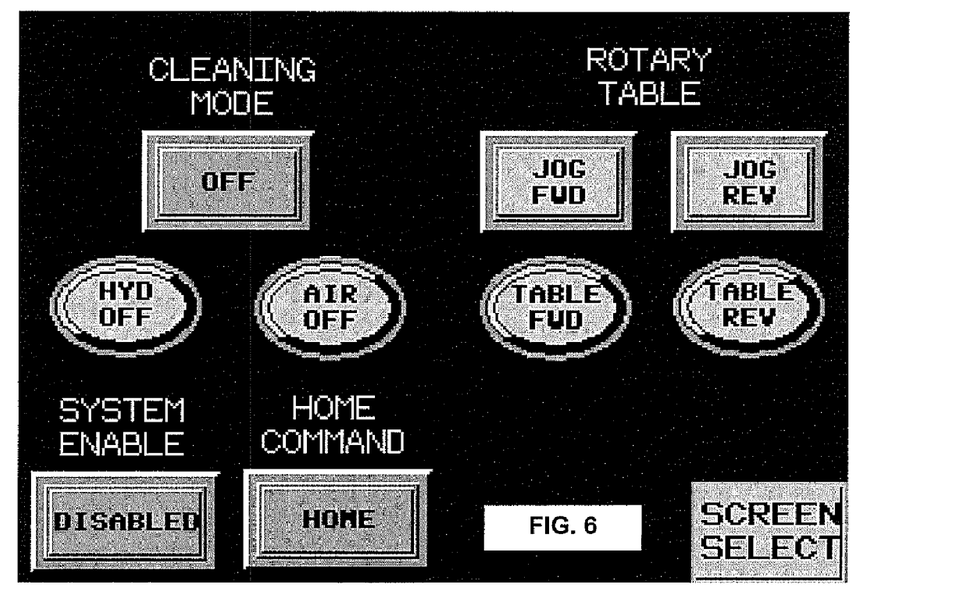
FIG. 6 is a screenshot of a main screen of the control panel of the rotary head splitting apparatus.

The main screen shown in FIG. 6 presents the operator with several options concerning operation of the machine. An onscreen button labeled "Cleaning Mode" is switchable between an "on" and "off" state. Cleaning mode is an operational state of the apparatus in which the main shaft and the head splitting units carried thereon can be rotated together in the same manner as they are for performing head splitting operations, but in which the functionality of the hydraulic cylinders to lift and lower the head trays as they move through the head splitting station is disabled. This way, each head tray and its respective head splitting blade remain stationary relative to one another through each and every full or partial rotation of the shaft. Therefore, under cleaning of the machine by directing a pressurized spray of water or other cleaning liquid or solution into the interior of the enclosure through the loading or discharge access openings in order to wash down the machine, the cleaning process is more effective as all of the head trays remain at the same elevation throughout the machine's rotation, thereby maximizing the number of trays exposed to the spray at any given moment in time.

Referring again to FIG. 6, pressing the "Cleaning Mode" button to switch it from its normal "off" state to the "on" state changes the state of an input on the PLC controller, which in response to this change sends an output signal to the solenoid of the main hydraulic flow control valve 106, causing the valve to move into a closed position cutting off the supply of pressurized fluid from the pump to the hydraulic cylinders of the head splitting units. As a result, in subsequent rotation of the shaft and the head splitting units carried thereon, actuation of the respective cylinder control valve 104 as its cam follower 104a rides up onto the cam tack 110 will not act the raise the respective cylinder piston due to the lack of a pressurized fluid source available to flow through the valve 104 to the lifting-side lower port of the two-way cylinder 44. Any cylinder found in an extended/raised state in the first portion of the head splitting station when the cleaning mode is activated to cut of the hydraulic fluid supply will automatically return to the retracted/lowered state when it descends off the cam track 110 under subsequent shaft rotation, as the switching of the cylinder's control valve 104 back to its normal condition when its cam follower 104a leaves the track 110 will open the previously pressurized portion of the cylinder below the piston to the previously, and still, unpressurized hydraulic return path, allowing the weight of the piston, head tray and head tray support to displace the fluid beneath the piston out of the cylinder. The pneumatic cylinder of the discharge device is also deactivated for cleaning mode operation by not sending any solenoid actuating signals to the pneumatic control valve 126 during such operation, thereby maintaining the default retracted state of the plow blade throughout rotation of the head splitting stations around the axis.

Even in an alternate embodiment where the blades are lowered down toward the head trays for the splitting operation, like in U.S. Pat. No. 4,653,145, instead of lifting the head trays up to the blades as described above for the preferred embodiment of the present invention, there is still be an advantage to a cleaning mode where each tray and blade remain spaced apart through the rotation, as maintaining the raised position of the blade away from the tray would improve access of the spray to the full topside of each tray, as blocking of fluid by the head splitting blade is avoided as the head tray passes through the head splitting station, as the blade and head tray are left at their maximum separation from one another at all points in the rotation. Thus flow of fluid toward, onto, over or across the topside of the blade is not subject to interference by the blade that would otherwise occur if spraying was conducted while the blades moved through their normal head splitting cycles. However, the preferred embodiment uses the tray lifting configuration described and illustrated herein so that any leakage of hydraulic fluid that might occur takes place beneath the trays so as not to contaminate the animal heads, and to simplify the cleaning mode operation by relying on gravity to keep the cylinders retracted, thereby making use of a simple "pump off" signal to put the system into cleaning mode. Moving blade embodiments with overhead hydraulic actuators could still have a cleaning mode option where the blades remain in the retracted positions far from the trays, for example by using spring-return cylinders which will automatically retract upward under spring force when fluid pressure is removed, whereby disconnection between the pressurized fluid supply and the cylinders for cleaning mode operation would cause the blades to occupy and remain in their spring-biased raised positions retracted upwardly from the head trays.

The main screen of FIG. 6 also features onscreen "Jog Forward" and "Jog Reverse" buttons, which when touched by the operator will send an output signal from the PLC to the gear motor to rotate the motor for the duration of the button contact (i.e. run the motor until the operator "releases" the button). The "forward" direction jogs the motor in this manner in the predetermined rotational direction corresponding to the sequence of the loading, head splitting and discharge stations in this order around the shaft (i.e. counterclockwise in the illustrated embodiment), with the "reverse" direction thus being the opposite (i.e. clockwise). The jog function allows the operator to reposition the head trays around the shaft axis from a stopped condition of the shaft. For example, should an operator fail to properly seat an animal head at a head tray passing by the loading station during operation of the apparatus for head splitting, the rotation of the shaft can be stopped (in any of a number of manners described herein further below) and the "Jog Reverse" button used to move the missed tray back to a suitable angular position about the shaft axis for access through the load access opening. Of course this is only one exemplary use of the jog function, and it may also be used to adjust the shaft's angular position for any other reason or purpose.

The main screen of FIG. 6 also includes a number of indicators switchable between "lit" and "unlit" or "highlighted" and "unhighlighted" display states, including "Hydraulics Off", "Air Off", "Table Forward" and "Table Reverse" indicators. The "Hydraulics Off" and "Air Off" indicators are respectively highlighted or lit up only when the supply of pressurized fluid for the hydraulic cylinders of the head splitting units is off and when the electrical supply for the solenoid of the pneumatic valve 126 is off (i.e. when the PLC program dictates that no solenoid-actuating output signal is to be sent to the pneumatic valve in rotation of the machine, such as in cleaning mode operation). One of the "Table Forward" and "Table Reverse" indicators is highlighted or lit up when the shaft and attached head splitting units are rotating, the highlighted indicator reflecting the particular rotational direction of that motion.

Figure 7:
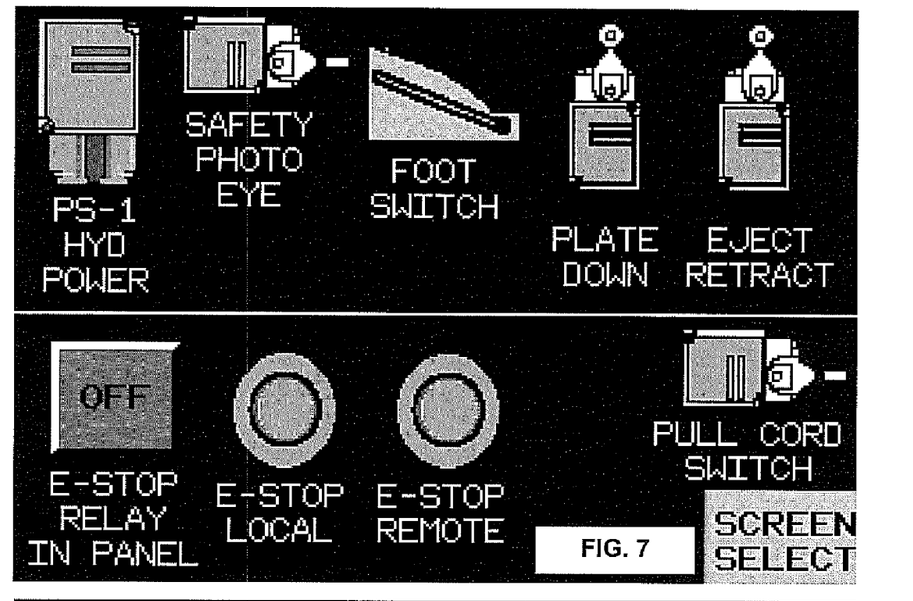
FIG. 7 is a screenshot of a device screen of the control panel of the rotary head splitting apparatus.
Figure 8:
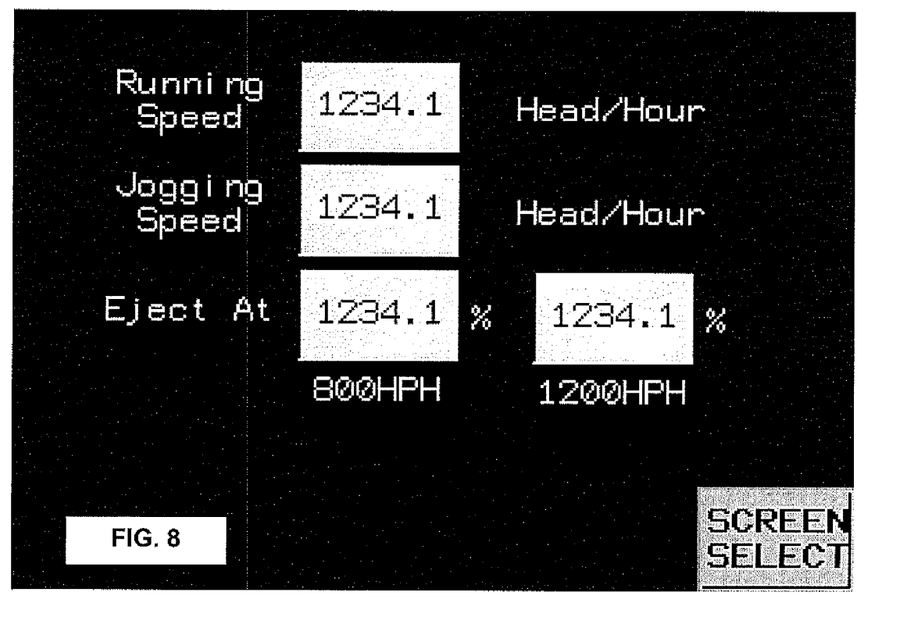
FIG. 8 is a screenshot of a setpoint adjustment screen of the control panel of the rotary head splitting apparatus.

An onscreen "Screen Select" button in FIG. 6, also present in the screenshots of FIGS. 6 to 8, returns the display to the "Screen Selection" screen of FIG. 5 when pressed by the operator.

Still referring to FIG. 6, an onscreen "Home Command" button causes the PLC to send an output signal to the motor to rotate the shaft from whatever it's current angular position to a default "home position", which the PLC determines has been reached upon receipt of an input signal from a proximity switch 142 or sensor positioned to be triggered by contact with or detection of one of the head trays when the head tray is in the predetermined "home position". FIG. 2 shows one of the head trays being located in the "home position" contacting the proximity switch 142 in the second half of the head-splitting station at a location aligning two other head trays with the discharge opening and loading opening respectively. The ability to set the angular position of the main shaft into a predetermined "home position" allows the rotary encoder to be of an incremental type that does not retain position or memory when powered down, as setting the machine to the home positioning upon initial powering up of the control system is used to mark a fixed angular location around the shaft axis from which angular movement of the shaft can be measured so that measured relative values from the encoder can be correlated to absolute locations of the head trays around the shaft. The home position need not necessarily align any tray with the loading or access openings in the enclosure panels.

Finally, the main screen of FIG. 6 also features a "System Enable" onscreen button, which when pressed switches the control system into an enabled state ready to operate the apparatus in either a head splitting mode or cleaning mode, depending on whether the "Cleaning Mode" button was set to "on" or "off". When enabled, the PLC monitors for an input signal from a foot pedal controller 134 (FIG. 1) that, in a conventional manner, has a button activated by foot pressure to close a normally-open momentary switch that maintains the closed condition of the switch only while the button remains depressed, and then automatically reopens under release of the button by removal of the foot pressure. Receipt of the input signal at the PLC from the foot controller 134 causes an output signal from the PLC to the gear motor to drive rotation of the motor in the predetermined direction, and so holding down the footswitch causes continual rotation of the head splitting units around the shaft sequentially through the loading, head-splitting and discharge stations until the footswitch is released. In the head splitting mode (i.e. with the clean mode option "off"), the PLC has output signals to maintain the hydraulic pump in an active state so that the head splitting operation takes place as each tray moves through the head splitting station, and to switch the position of the pneumatic valve 126 as each head moves through the discharge station to first retract the pneumatic cylinder as the tray passes the discharge opening and subsequently re-extend the pneumatic cylinder before the next tray reaches the discharge opening at the discharge station. In cleaning mode, the cylinders (hydraulic and pneumatic) are not used, and so the PLC output is change to deactivate the pump and effectively disconnect the compressed air source from the pneumatic cylinder.

The apparatus employs a number of safety devices connected to the PLC controller to monitor conditions or receive input from the operator and stop operation of the apparatus should such conditions or input reflect a situation warranting such action. With reference to FIG. 4, an optical proximity switch 136 is mounted on a guard plate 137 beside the access opening 94 at the loading station and positioned such that if the operator reaches too far into the machine (i.e. past a predetermined threshold distance) he or she will break the beam on the optical sensor and cause the machine to stop operating, and a pull cord emergency shut off 138 is suspended below the loading station access opening 94 and spans around the enclosure from one side of the a control panel mounting plate 96 to the other. In a conventional manner, pulling the cord will withdraw a plug at one end thereof from a mating socket, breaking a current path to an input of the PLC, which responds to such signal loss by shutting down the motor to stop rotation of the head splitting units. A proximity switch 140 in FIG. 2 detects retraction of the plow blade at the discharge station, with the PLC monitoring one of its inputs for a signal from this sensor after passage of sufficient time or shaft rotation to suggest that the retraction should be complete. The other proximity switch 142, the same as described above for use in determining the home position, is positioned late in the head splitting station (see FIG. 1) or early in the discharge station and similarly detects successful retraction of each hydraulic cylinder to lower the respective head tray to its default position before reaching the discharge device after the head splitting operation, and provides a corresponding signal to the PLC. A lack of "cylinder retracted" signal from either cylinder-monitoring proximity switch at a time or rotational position at which such a signal is expected based on the number of head splitting stations equally spaced apart around the axis causes the PLC to interrupt the drive signal to the motor and thus cease operation of the apparatus. Magnetic switches are used to detect that each of the openable panels of the enclosure are in their closed positions, and are wired together in a relay circuit connected to the control panel to interrupt or prevent operation of the electric motor if any one or more of the switches are open, indicating one or more panels are in the open position.

FIG. 7 shows a "Device Screen" that can be selected from the "Screen Selection" screen of FIG. 5 for visual feedback on the status of various safety devices and inputs, for example to aid in trouble shooting the machine when the apparatus either automatically stops rotation during an operation, or won't start rotation in response to a "jog" input from the control screen or in response to a combination of a "system enable" input from the control screen and subsequent foot controller input. On this screen, the "Safety Photo Eye" indicator will be highlighted if the optical sensor 136 has been triggered, the "Plate Down" indicator will be highlighted if one of the head trays failed to descend after the head splitting station, the "Eject Retract" indicator will be highlighted if the discharge/eject cylinder failed to retract at the discharge station, the "E-stop relay in panel" indicator will be highlighted in response to detection by the PLC that the relay in the control panel has been tripped by unseating of one or more of the protective enclosure panels from its fully closed position, and a "Pull Cord Switch" indicator will illuminate if the emergency shut off cord has been pulled. A "Foot Switch" indicator illuminates whenever no signal is received from the foot switch 134, an "E-stop local" indicator illuminates if depression of an emergency stop button 144 on the control panel has taken place to deactivate the motor output, a "Hydraulic Power" indicator illuminates if a "stop pump" switch 146 or button on the control panel is pressed to deactivate the pump by disconnecting power to the drive motor thereof, and an E-Stop Remote" indicator illuminates if an emergency stop button 148 mounted remote from the panel, for example near the access opening of the loading station on a support leg of the frame as shown in FIG. 4, is pressed to stop the motor.

Figure 9:
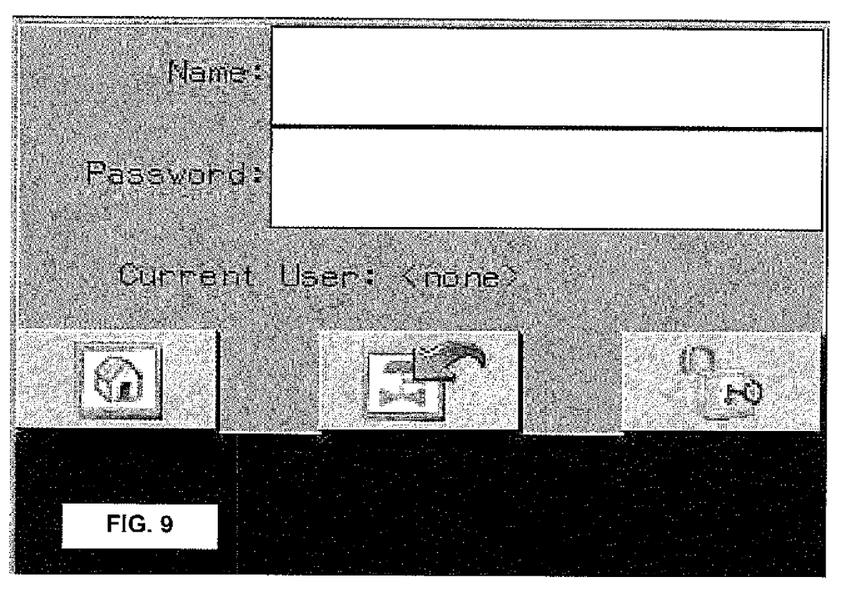
FIG. 9 is a screenshot of a login screen of the control panel of the rotary head splitting apparatus.

FIG. 8 shows a "Setpoint Adjustment Screen" that can be accessed from the "Screen Selection Screen" of FIG. 5 if the user has logged in via the "Login Screen" of FIG. 9, also accessed from the "Screen Selection Screen". The "Setpoint Adjustment Screen" provides selectable input fields for setting different operational parameters of the apparatus, particularly relating to operational speeds of the electric gear motor. The operator can change the "Running Speed" of the machine, which refers to the rotational speed of the motor/shaft/splitting-units assembly under actuation of the footswitch, or the "Jogging Speed" which refers to the rotational speed of the motor while either of the "Jog" buttons is held down for manual positioning or fine-tuning of the angular position. In the illustrated embodiment, the speeds are expressed on the display screen in "Head/Hour" to reflect the number of animal heads that would be split under continuous rotation at the operator-set speed for one hour. In the illustrated embodiment having four head-splitting stations, four heads are split per full revolution of the shaft, so the number of heads per hour equals the revolution per minute of the shaft multiplied by 240 (Heads/Hr=Rev/Minute×Min/Hr×Heads/Rev=RPM×60×4=RPM×240). The control system may be configured to limit the range of user selectable speeds, for example from 800 to 1200 heads/hour (3⅓ to 5 RPM) for the running speed and 200 to 800 heads/hour for the jogging speed. Changes in the different speed values affect the PLC's output signal to the motor running of the machine in foot-pedal operation (i.e. head-splitting or cleaning) and during manual jogging of the machine between such foot-pedal operations.

At higher rotational speeds of the shaft, the pneumatic cylinder should be extended earlier in the shaft rotation than for lower rotational speeds in order to ensure that the plow blade reaches the extended position before the head tray reaches the plow blade, otherwise the split head on the head tray will interfere with the extension of the plow blade, preventing it from getting behind the head as required to then pull the head off the tray during the subsequent retraction stroke. In one embodiment, when the PLC detects that user input has been received to change the running speed of the machine, and accordingly changes the output signal that is output to the motor when the footswitch is depressed, it automatically changes the values of the angular positions of the shaft at which the pneumatic cylinder of the discharge device is to be extended. Similarly, the system may adjust the values of the angular positions of the shaft at which the pneumatic cylinder of the discharge device is to be subsequently retracted after each extension in order to adjust the overall timing of the full discharge/ejection cycle relative to the rotational running speed of the shaft-carried head splitting stations for optimum performance using predetermined settings.

In other embodiments, the system may be configured to additionally or alternatively give user-control over the timing of the ejection device operation. For example, FIG. 8 shows two user-input "eject at" fields on the setpoint adjustment screen, one field being labeled with the embodiment's minimum selectable running speed (800 heads/hour) and the other labeled with the maximum selectable running speed (1200 heads/hour). The system stores data on an angular quantity, for example a predetermined number of degrees, which represents a maximum offset value that can be added to or subtracted from each default angular position of the shaft at which the pneumatic cylinder is to be extended as a head tray approaches it. Each of the two fields is labeled with a percentage symbol (%), to convey to the operator that they can enter an integer value between 0 and 100. A zero value entered (zero offset) in either field means that, when the machine is set to run at the respective one of the minimum or maximum allowable running speed) the PLC, in the head splitting mode, will send an actuation signal to the pneumatic cylinder control valve 126 every time the input from the encoder matches up to one of the predetermined angular positions (of which there are four, one for each head tray). A value of "100" entered in the minimum speed "eject at" field means that, with the running speed set at the minimum selectable value of the predetermined range (e.g. 800 heads/hour), 100% of the offset value will be added to the default "cylinder extension" angular position so that the pneumatic cylinder will extend when the shaft has reached the maximum offset number of degrees past the default position in the head splitting mode. A value of "100" entered in the maximum speed "eject at" field means that, with the running speed set at the minimum selectable value of the predetermined range (e.g. 1200 heads/hour), 100% of the offset value will be subtracted from the default "cylinder extension" angular position so that the pneumatic cylinder will extend when the shaft the maximum offset number of degrees before the default position. Should the user enter a running speed having a value between the minimum and maximum values of the allowable range, the PLC can use the maximum and minimum allowable running speeds and their two offset percentages together with this input running speed to interpolate an offset percentage to use to calculate the user-adjusted "cylinder extend" angular positions of the shaft. Giving user-control over the relationship between the rotational speed of the machine and the ejection cycle allows an operator to fine tune performance at the discharge station to better ensure proper ejection of split heads from the machine to minimize machine downtime.

FIG. 9 shows the "Login Screen". Selecting the "Name" or "Password" field brings up the keyboard screen to enable the operator to enter characters into the corresponding field. An onscreen "Home" button takes the user back to the "Screen Selection" screen, an onscreen "Arrow" button takes to the user to the "Setpoint Adjustment Screen", and an onscreen "Lock/Key" button logs the user in after having entered a valid username and password combination. Using password protected access to the "Setpoint Adjustment Screen" is useful, for example, to limit speed adjustment to only authorized personnel (e.g. plant management), for example to use lower speeds for training new operators and allow higher speeds for experienced operators capable of handling greater throughput at the machine in a safe and effective manner.

Figure 10:
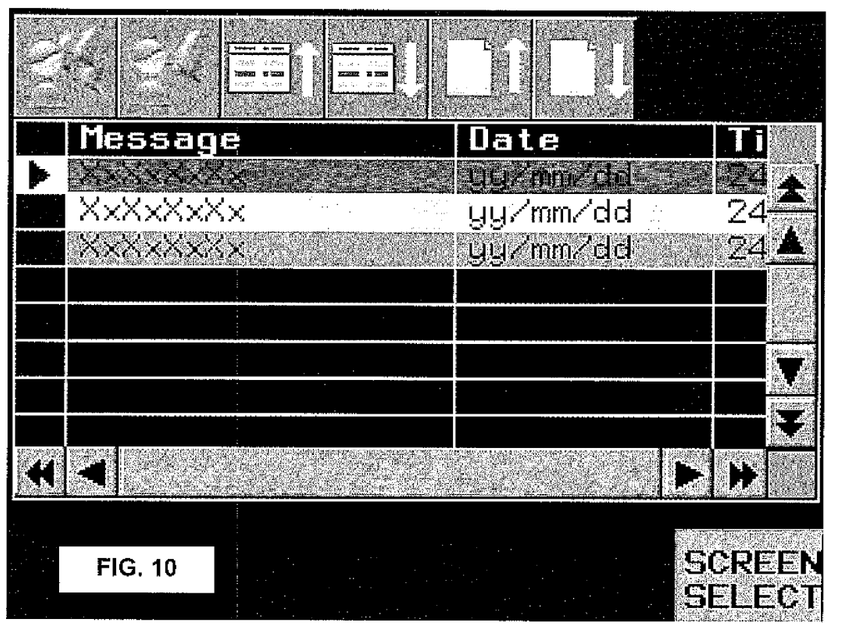
FIG. 10 is a screenshot of an alarm summary screen of the control panel of the rotary head splitting apparatus.

FIG. 10 shows an "Alarm Summary Screen" selectable from the "Screen Selection" screen of FIG. 5. Here, information on alarm events that previously prevented or ceased operation of the apparatus is summarized based on data recorded by the control system when such alarm events took place. The information in the illustrated embodiment includes a message indicating the type of alarm event (emergency cord pull, open enclosure panel, emergency stop relay button actuation, etc.) and the date and time at which the event occurred, organized in a table layout. User-selectable buttons are presented to allow operator-controlled sorting of the listed events based on different criteria.

The preferred embodiment of the present invention benefits not only from the from the unique "cleaning mode" operation, in which efficient and thorough spray down of the machine can be performed by maximizing exposure of the head trays to a cleaning fluid being sprayed into the machine from a stationary point by rotating the head splitting stations around the machine with the trays and blades maintained in a spaced apart condition throughout the rotation, but additionally offers advantages over prior art machines employing hydraulic rotational drives. The combined use of an electric motor and PLC, or other computerized control system employing a processor to execute a machine readable program instructions stored in computer readable memory to monitor incoming signals and accordingly adjust output signals to the equipment being controlled, allows owners, operators or other personnel to easily modify operational aspects of the machine through a computerized user interface, thus avoiding having to swap out or manually adjust hydraulic control components. It also gives the option of being able to password-protect access to these settings to limit who is able to change operational parameters of the machine.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A livestock head splitting apparatus for splitting livestock heads, the apparatus comprising:
   a frame;
   a vertical shaft supported on the frame and rotatable about a vertical longitudinal axis of the shaft;
   a plurality of head trays positioned circumferentially about the shaft and extending horizontally away therefrom, each head tray being connected to the shaft for movement about the axis sequentially through loading, head-splitting and discharge stations circumferentially spaced around the shaft under rotation of the vertical shaft in a predetermined direction;
   a plurality of head splitting blades disposed above the head trays in positions lying respectively thereover and arranged to move with the head trays about the axis through the loading, head-splitting and discharge stations under rotation of the vertical shaft in the predetermined direction;
   a head splitting actuation system operable in cooperation with the head trays and the head splitting blades under rotation of the shaft to drive each head tray and the respective head splitting blade relatively toward one another from spaced apart positions during passage through the head-splitting station and subsequently draw the head tray and respective head splitting blade relatively away from one another back to the spaced apart positions while approaching the discharge station; and
   a control system cooperatively linked with the head splitting actuation system and operable to switch into and out of a head splitting mode of operation in which the shaft is driven to carry the head trays through full revolutions around the vertical axis and the head splitting actuation system forces together and draws apart each head tray and the respective head splitting blade during passage through the head splitting station, and a cleaning mode of operation in which the shaft is driven to carry the head trays through full revolutions around the vertical axis and each head tray and the respective head splitting blade are not driven toward one another at any time during said full revolutions around the vertical axis.

2. The apparatus of claim 1 wherein the control system is arranged to remove a source of power from the actuation system under switching into the cleaning mode and apply said source of power to the actuation system under switching into the head splitting mode.

3. The apparatus of claim 2 wherein the source of power for the actuation system is provided by a hydraulic pump for actuating hydraulic actuators of the actuation system, and a rotational drive system coupled to the shaft to effect the rotation thereof is operable separately from the hydraulic pump.

4. The apparatus of claim 3 wherein the rotational drive system comprises an electric motor linked to the shaft to effect the rotation thereof.

5. The apparatus of claim 2 wherein the head trays and the head splitting actuation system are arranged to effect lifting of each head tray toward the respective blade in the head splitting mode of y.

6. The apparatus of claim 1 comprising an enclosure closing around the shaft and the loading, head-splitting and discharge stations disposed circumferentially around the shaft, the enclosure comprising at least one access opening through which fluid can be sprayed to clean an interior of the enclosure, whereby operation in the cleaning mode effects rotation of the head trays past the access opening and maintains the head trays and the blades in the spaced apart positions throughout said rotation to maximize exposure of said trays to sprayed fluid.

7. The apparatus of claim 1 wherein the control system is arranged to perform confirmation of successful drawing apart of each head tray and respective head splitting blade back to the spaced apart positions, and to stop rotation of the shaft under a lack of said confirmation for any tray.

8. The apparatus of claim 1 comprising a discharge device operable in the head splitting mode to displace a split head from off each head tray as said head tray moves through the discharge station, wherein the control system comprises a sensor operable to provide confirmation of successful head displacement operation of the discharge device for each tray passing through the discharge station in the head splitting mode and is arranged to stop rotation of the vertical shaft under a lack of said confirmation for any tray.

9. A livestock head splitting apparatus for splitting livestock heads, the apparatus comprising:
a frame;
a vertical shaft supported on the frame and rotatable about a vertical longitudinal axis of the shaft;
a plurality of head trays positioned circumferentially about the shaft and extending horizontally away therefrom, each head tray being connected to the shaft for movement about the axis sequentially through loading, head-splitting and discharge stations circumferentially spaced around the shaft under rotation of the vertical shaft in a predetermined direction;
a plurality of head splitting blades disposed above the head trays in positions lying respectively thereover and arranged to move with the head trays about the axis through the loading, head-splitting and discharge stations under rotation of the vertical shaft in the predetermined direction;
a head splitting actuation system operable in cooperation with the head trays and the head splitting blades under rotation of the shaft to drive each head tray and the respective head splitting blade relatively toward one another from spaced apart positions during passage through the head-splitting station and subsequently draw the head tray and respective head splitting blade relatively away from one another back to the spaced apart positions while approaching the discharge station;
an electric motor linked to the shaft to effect the rotation thereof; and
a computerized control system linked to the motor and comprising an input device arranged to receive input from an operator for controlling at least one operational parameter of said electric motor;
wherein the computerized control system is arranged to receive separate user inputs for respectively carrying out ongoing rotation of the shaft for head splitting operations and incremental rotation of the shaft between such operations for logging of the head trays into a desired position around the axis.

10. The apparatus of claim 9 wherein the computerized control system is arranged to change a rotational running speed of the motor for the head splitting operations in response to user run speed input at the input device.

11. The apparatus of claim 9 wherein the computerized control system is arranged to change a rotational jogging speed of the motor for the jogging of the head trays in response to user jog speed input at the input device.

12. The apparatus of claim 10 comprising a discharge device operable to displace a split head from off each head tray as said head tray moves through the discharge station, wherein the control system is arranged to change an operational parameter of the discharge device according to the change of the rotational running speed based on the user run speed input.

13. The apparatus of claim 12 wherein the control system is arranged to change a point in rotation of the shaft at which the discharge device is actuated.

14. The apparatus of claim 9 wherein the computerized control system comprises a sensor operable to provide confirmation of successful displacement operation of the discharge device for each tray passing through the discharge station, the computerized control system being arranged to stop rotation of the electric motor under a lack of said confirmation for any tray.

15. The apparatus of claim 9 wherein the computerized control system comprises a sensor operable to provide confirmation of successful drawing apart of each head tray and respective head splitting blade back to the spaced apart positions while approaching the discharge station, the computerized control system being arranged to stop rotation of the electric motor under a lack of said confirmation for any tray.

16. The apparatus of claim 9 wherein the computerized control comprises a processor, memory linked to the processor, and a program stored on the memory, the program including program code executable by the processor to display prompts to the operator at a display device for input from an input device on the operational parameter of said electric motor, store data reflective of said input and use said data to adjust an output signal to be sent to the motor for control of the operational parameter thereof during operation of the motor.

17. The apparatus of claim 16 wherein the program code includes program code executable by the processor to prompt the operator at the display device for an authorized password and verify an entered password as the authorized password before prompting the operator for the input on the operational parameter of said electric motor.

18. The apparatus of claim 10 wherein the computerized control system is arranged to change a rotational jogging speed of the motor for the jogging of the head trays in response to user jog speed input at the input device.

* * * * *